United States Patent
Barkarö et al.

[11] Patent Number: 6,167,135
[45] Date of Patent: Dec. 26, 2000

[54] METHOD AND APPARATUS FOR GENERATING A RINGING SIGNAL

[75] Inventors: Stefan Barkarö, Solna; Torbjörn Randahl, Nacka; Berndt Wallin, Lidingö; Sven Wiklund, Upplands Väsby, all of Sweden

[73] Assignee: Telefonaktiebolaget LM Ericsson, Stockholm, Sweden

[21] Appl. No.: 09/086,668

[22] Filed: May 29, 1998

Related U.S. Application Data

[63] Continuation of application No. PCT/SE96/01585, Dec. 2, 1996.

[30] Foreign Application Priority Data

Dec. 1, 1995 [SE] Sweden .................................. 9504318

[51] Int. Cl.$^7$ .................................................. H04M 9/00
[52] U.S. Cl. ......................... 379/418; 379/252; 379/373; 379/375
[58] Field of Search .................................. 379/418, 373, 379/375, 361, 377, 251, 252, 253, 399, 400, 401, 394, 398, 403, 413; 84/600; 307/106; 363/13, 157, 21

[56] References Cited

U.S. PATENT DOCUMENTS

| | | | |
|---|---|---|---|
| 4,220,826 | 9/1980 | Kiss | 379/418 |
| 4,961,219 | 10/1990 | Patel | 379/398 |
| 5,228,081 | 7/1993 | Warner et al. | 379/399 |
| 5,260,996 | 11/1993 | Dillon et al. | 379/418 |
| 5,307,407 | 4/1994 | Wendt et al. | 379/418 |
| 5,323,455 | 6/1994 | Le Corre | 379/418 |
| 5,490,054 | 2/1996 | Hanebrink, Jr. | 379/418 |
| 5,553,132 | 9/1996 | Randahl | 379/252 |
| 5,694,465 | 12/1997 | Apfel | 379/377 |
| 5,734,712 | 3/1998 | Randahl | 379/382 |
| 5,764,755 | 6/1998 | Chen | 379/399 |
| 5,838,788 | 11/1998 | Jakab | 379/413 |
| 5,872,842 | 2/1999 | Daly et al. | 379/377 |

FOREIGN PATENT DOCUMENTS

| | | |
|---|---|---|
| 2 113 044 | 7/1983 | United Kingdom . |
| 95/20290 | 7/1995 | WIPO . |

*Primary Examiner*—Forester W. Isen
*Assistant Examiner*—Jacques Saint-Surin
*Attorney, Agent, or Firm*—Burns, Doane, Swecker & Mathis, L.L.P.

[57] ABSTRACT

In generating a ringing signal of predetermined frequency and shape between the A- and B-wires to a subscriber's station in a telephone network, the ringing signal is directly injected in or superposed on the DC-levels of the wires. A voltage difference converting device converts any voltage difference between the A- and B-wires into a first current. A signal generating device generates a first voltage of the frequency and shape of the ringing signal to be generated, and a signal converting device then converts the first voltage into a second current. In a summation node the first current is subtracted from the second current to obtain a third current and this current is converted by passing it through a resistor to a second voltage. The second voltage is buffered and is again converted to a fourth current by applying the voltage to resistor. This fourth current is amplified by current amplifiers circuits comprising operational amplifiers, and is then supplied to the A-wire and drawn from the B-wire.

14 Claims, 5 Drawing Sheets

METHOD AND APPARATUS FOR GENERATING A RINGING SIGNAL

This application is a continuation of International Application No. PCT/SE96/01585, which was filed on Dec. 2, 1996, which designated the United States, and which is expressly incorporated here by reference.

TECHNICAL FIELD

The invention relates to a method and apparatus for generating a ringing signal of predetermined frequency and shape on a telephone line to a subscriber's station, the signal being applied between the A-wire and the B-wire of the telephone line.

BACKGROUND

In applications with line interface circuits, LICs, for interfacing to subscriber stations or subscriber telephone sets with a telephone network it is necessary to be able to send a ringing signal to the subscriber which is connected to a specific LIC. The ringing signal is sent as a transversal signal between the two wires, A and B, which constitute the interface towards the subscriber's station. The lowest allowable amplitude of the ringing signal is dependant on the length of the subscriber's line, and on the impedance of the bell or tone ringer in the subscriber's station at the ringing frequency. The requirement is that the ringing signal must have a root-mean-square value of at least 40 V above the bell. The bell constitutes a pure AC load on the line which has a very high resistance for DC when the subscriber set is on-hook.

The frequency of the ringing signal is specific to different countries and is as a rule between 20 and 50 Hz. In present applications, the ringing signal is substantially purely sinusoidal comprising substantially no higher-order harmonics in order to avoid interference with adjacent lines.

Two major types of ringing can be distinguished, balanced ringing and unbalanced ringing.

In unbalanced ringing, one of the wires is maintained at a stable or substantially constant potential, whereas on the other wire, the ringing signal is superimposed on a DC level. In some cases during ringing, the A-wire is kept at the stable potential and in other cases the B-wire. Unbalanced ringing is the most common type of ringing and is used e.g. in the U.S. and in many Asian countries.

In balanced ringing, the ringing signal is divided between the two wires. Normally, half the signal is applied onto the A-wire and half onto the B-wire, the common mode voltage being maintained at a constant level. Balanced ringing is relatively unusual but is used e.g. in France and in certain African countries.

For both types of ringing, the DC levels of the two wires have to be separated by an offset voltage, called ring trip battery, in order to be able to detect a DC load on the line, i.e. when someone lifts the handset during ringing.

It is specified for all countries that one of the wires is to be maintained at a given potential from a DC point of view (e.g. in the US, the A-wire is to be maintained at about ground potential) whereas the other wire shall have a DC level which is one ring trip battery from the DC level of the A-wire. This requirement stems from the fact that it should be ensured that the line current (DC) will be high enough when someone lifts the handset during ringing.

The ring trip battery used in systems of today corresponds to the DC battery at open line when the circuit is in idle mode (normally around 50 V but depending on the country). Since the ringing signal is sinusoidal (a form factor of 1.41) one of the wires will exceed ground potential sometime during the ringing period.

As an example, in the U.S., the A-wire remains at ground potential while the B-wire rings. At an infinitesimal line (0Ω), the peak value of the ringing signal will be 56.5 V in order to obtain 40 V r.m.s. across the bell. For this solution, the ring trip battery is normally around 48 V. Thus, the B-wire will exceed ground potential during some part of the ringing period for this solution. In order to manage normal line lengths, the signal level of the ringing signal has to be further increased (the line adds 180 Ω/km).

In telephone systems of today, the ringing signal is applied to the line by connecting an external ringing generator by means of relays. This generator is very expensive and is often shared by a plurality of lines in order to reduce the cost per line. This results in that the reliability of the ringing function will be poor owing to the fact that a defective ringing generator will render many lines inoperative. Also, the ringing relays are relatively expensive and occupy a considerable area on the line interface board on which the LIC is fitted. This results in that fewer lines can be located on such a board, implying high overhead costs per line. Moreover, an external, ring-trip resistor network is needed to detect when someone lifts the handset during ringing.

A trend today in telephone systems is to move towards smaller modules (remote subscriber stages). This results in that small magazines containing LICs for few lines are obtained. Of course, it is possible also in these systems to have the ringing generator shared by the lines of the magazine but to the price of a very high overhead cost.

Another trend is to have large magazines containing many lines. For magazines of this type, the packing density of the line interface board will be vital. Bulky ringing connection relays and ring trip networks occupy a lot of space on the board surface. In this scenario, the ringing generator can be shared by many lines and will not be so costly, however to the price of a poor reliability of the ringing function.

Efforts have been made to produce LICs by means of which the ringing signal can be applied directly onto the line. One attempt has been to place a relay substitute module on silicon, via which an external ringing generator could be connected. There are, however, several problems associated with this solution. The relays have to be of very low resistance when the LIC is connected, which is difficult to implement. Moreover, the ringing relays must be able to withstand high voltages. Furthermore it should be pointed out that a ringing generator as well as external ring trip resistor networks still are needed which is one of the major problems.

A method and arrangement for generating a ringing signal is disclosed in U.S. patent U.S. Pat. No. 5,553,132 corresponding to the published International patent application WO-A1 95/20290, this patent application being incorporated herein by reference. The currents provided to the subscriber lines are directly modulated for providing the ringing signal. The current input terminal of a subscriber's line interface receives the output signal of an operational amplifier and the output signal of a low level signal generator, resulting in providing to the current input terminal the sum of a first current generated by a voltage which is a function of an output voltage of the line interface circuit and which is applied over a first resistor, and a second current generated by the output of the signal generator applied over a second resistor.

Another method for generating ringing signals is disclosed in British patent application GB-A 2 113 044, where also a ringing current is directly injected into the lines as derived from a low level signal generator.

SUMMARY

An object of the invention is to integrate the ringing function in a LIC in a cost and space efficient manner, also allowing a simple control of the DC-voltage levels on the wires connected to a subscriber station.

This is attained by the general steps of: generating a ringing signal of predetermined frequency and shape between the A- and B-wires to a subscriber's station, mainly, by converting any voltage difference between the A- and B-wires into a first current, generating a first voltage of the frequency and shape of the ringing signal to be generated, converting said first voltage into a second current, subtracting said first current from said second current to obtain a third current, converting said third current into a second voltage, buffering said second voltage, converting said buffered voltage into a fourth current, amplifying said fourth current, and supplying the amplified fourth current to the A-wire while drawing the amplified fourth current from the B-wire.

This object is also attained by generally providing voltage difference converting means for converting any voltage difference between the A- and B-wires into a first current, signal generating means for generating a first voltage of the frequency and shape of the ringing signal to be generated, signal converting means for converting said first voltage into a second current, a summation node for subtracting said first current from said second current to obtain a third current, current-voltage converting means for converting said third current into a second voltage, buffering means for buffering said second voltage, voltage-current converting means for converting said buffered voltage into a fourth current, current amplifier means for amplifying said fourth current, and lines for supplying the amplified fourth current to the A-wire while drawing the amplified fourth current from the B-wire.

To the current amplifier means also currents are delivered, which are superposed on the ringing signal currents, for providing the DC-levels of the telephone wires. By using currents instead of voltage, the superposition is made by simply connecting the electrical lines carrying the desired currents. The difference in DC-level between the telephone lines, the ring-trip battery, is easily set by providing a constant current from a suitable current source to the summation node.

BRIEF DESCRIPTION OF THE DRAWINGS

The invention will be described in detail by way of non-limiting embodiments with reference to the accompanying drawings, in which.

DETAILED DESCRIPTION

Figure 1:
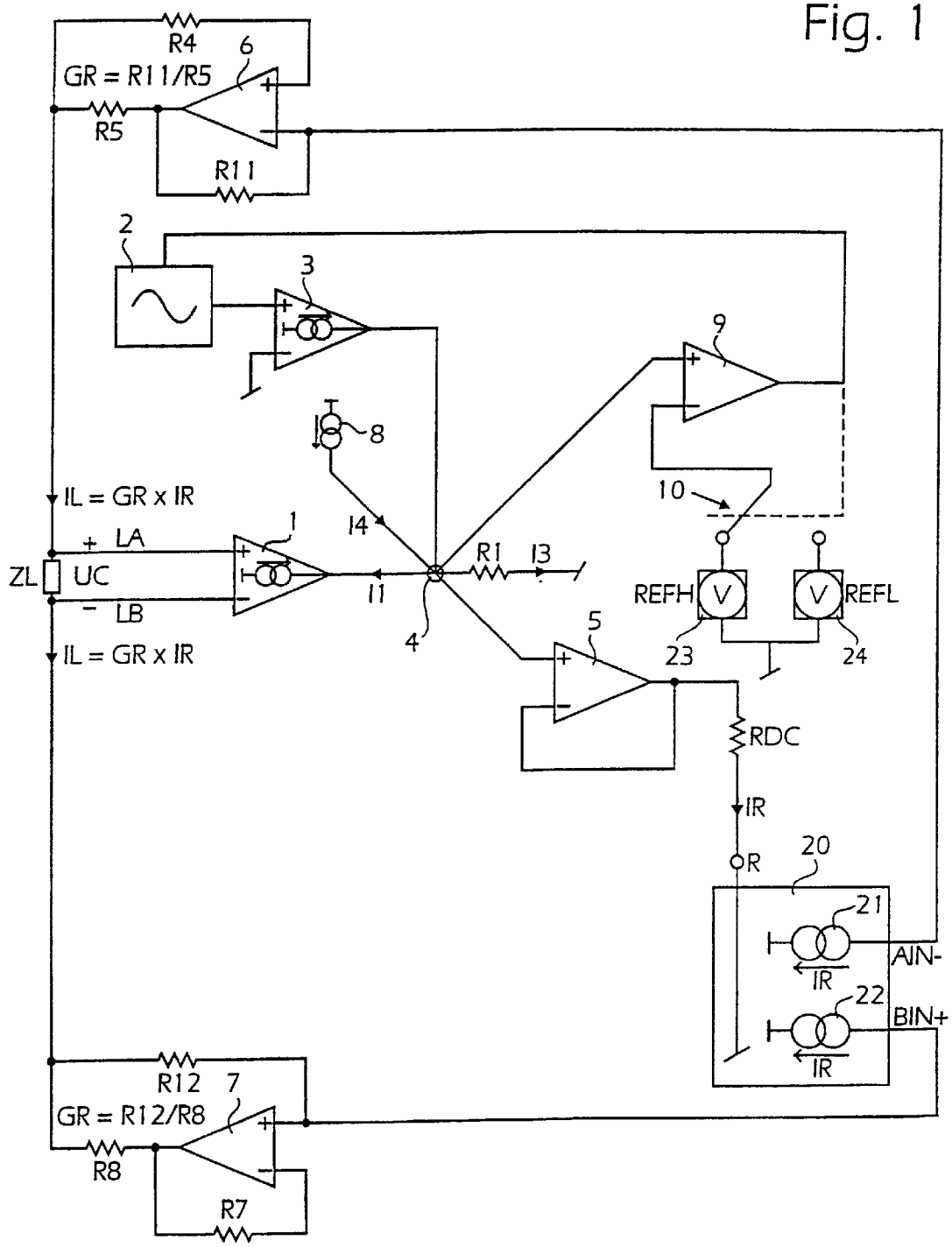
FIG. 1 is a circuit diagram of an apparatus for supplying a ringing signal to subscriber lines.

FIG. 1 shows an embodiment of an apparatus for generating a ringing signal between the A- and B-wires, LA and LB, respectively, to a subscriber's station represented by an impedance ZL. The line current is denoted IL and the line voltage, i.e. the voltage across the impedance ZL, is denoted UL.

A voltage difference converting means in the shape of e.g. a transconductance amplifier 1 has its inputs connected to the A- and B-wires, and is adapted to convert a voltage difference UL between the A- and B-wires LA and LB into a first current I1 having a backward direction, towards the amplifier output terminal. A signal generator 2 is provided for generating a low voltage signal having the same frequency and the same basic shape as the desired ringing signal. It can be switched on and off to provide ringing signal bursts by suitable control means, not shown. A transconductance amplifier may for example be built from a suitably connected operational amplifier controlling a controllable current source such as some transistor circuit comprising a transistor having its base connected to the output terminal of the operational amplifier.

Another transconductance amplifier 3 has its input terminals connected to the output terminal of the signal generator 2 to transform the low voltage signal provided by the signal generator 2 into a current I2, this current then having same frequency and the same basic shape as that generated by the signal generator 2 and thus as the desired ringing signal and being directed forwards, in the conventional direction, away from the output terminal of the amplifier 3.

The output terminals of the transconductance amplifiers 1 and 3 are interconnected in a summation node 4, and the summation node 4 is connected to signal ground via a resistor R1. Thus, due to the indicated current directions, the current I1 is subtracted from the current I2 in the summation node 4 to produce a current I3 flowing through the resistor R1 to signal ground. The current I3 through the resistor R1 produces a voltage in the summation node 4 as referenced to signal ground.

A buffer or isolating amplifier 5 is provided to buffer this voltage, the buffer amplifier basically being an operational amplifier connected for an amplification e.g. equal to one. Thus, the node 4 is connected to the positive input terminal of the amplifier 5, the negative input terminal being connected to the output terminal thereof. The output terminal of the buffer amplifier 5 is connected to virtual signal ground through a resistor RDC. Hereby, the output voltage from the buffer amplifier 5 and thus the potential in the node 4 will be transformed into a current IR having a suitable magnitude through the resistor RDC. This current IR is sensed and mirrored by a current mirror device 20, connected between the resistor RDC and ground. Thus, effectively, the mirror device comprises two current generators 21, 22 having output terminals AIN−, BIN+ respectively, from which currents having the same intensity as that of the current IR are drawn.

The current intensity IR will then represent the current to be injected into the subscriber lines and thus the current generator 21 is arranged for the A-wire LA and the current generator 22 for the B-wire LB. The currents IR drawn by the current generators 21, 21 are amplified by a factor GR by means of current amplifier means comprising operational amplifiers 6 and 7 connected to the A- and B-wires LA and LB, respectively. For the A-wire the current IR is drawn from the negative input terminal of the first operational amplifier 6, the positive input terminal thereof being connected to the A-wire LA through a resistor R4. The amplifier 6 is connected to produce a gain of GR by means of further resistors R5, R11 having resistances selected accordingly, i.e. the ratio R11/R5 is selected to be equal to GR. The resistance of the resistor R4 is equal to that of R11. The resistor R11 is connected between the negative input terminal of the operational amplifier 6 and its output terminal. The other resistor R5 is connected between the output terminal and the A-wire. The amplified current GR×IR is in this way supplied to the A-wire LA.

The second operational amplifier 7 arranged for driving the B-wire is connected in a similar way. The current intensity IR is thus drawn from the positive input terminal thereof, which is also directly connected to the B-wire LB through a resistor R12 corresponding to the resistor R4 for the first amplifier. Resistors R7, R8 are also connected as the resistors R11, R5 for the first amplifier 6, i.e. the resistor R7 is connected between the negative input terminal and the output terminal of the second amplifier 7, the output terminal being connected to the B-wire through the resistor R8. The resistors R7 and R8 are selected to produce the desired gain and thus have resistance values so that R7/R8=GR. The resistor R12 has the resistance as the resistor R7 and thus R12/R8=GR. In this way the current GR×IR is drawn from the B-wire LB as illustrated in FIG. 1.

Typically the current IR will be amplified several hundreds of times by the current amplifying circuits comprising the operational amplifiers 6, 7, e.g. by a factor GR=800. This means that the input current intensity IR can be low. The output resistors R5, R8 have rather small resistances, e.g. a few ohms such as 6–7 ohms.

To set the ring-trip battery, i.e the difference in DC level between the A- and B-wires when the subscriber line is open (on-hook), a current source 8 is provided to supply a constant DC-current I4 having a magnitude, that is selected correspondingly, to the summation node 4.

To detect lifting of the handset, i.e. to detect that the subscriber has answered which is indicated by the change of the impedance ZL to provide now a small resistance to DC-currents, a comparator 9 as shown in FIG. 1 is provided to compare the voltage in the summation node 4 to either a high reference voltage REFH from a voltage source 23 or a low reference voltage REFL from a voltage source 24, the voltage sources generating voltages with reference to signal ground. These reference voltages REFH and REFL are applied to the comparator 9 by means of a schematically indicated switch 10. The comparator 9 thus has its positive input terminal connected to the node 4 and its negative input terminal connected to the switch 10. Normally, when the handset is on, i.e. for hook-on, the switch 10 will have the position indicated in the figure, i.e. the voltage in the node 4 is compared to the high voltage reference REFH.

When the voltage in the summation node 4 exceeds the high reference voltage REFH, both referenced to signal ground, what represents or indicates the case where the subscriber has answered because then the voltage between the wires will be small and then only a small current I1 is drawn from the node 4, a logic one is generated by the comparator 9 and this output signal is used for controlling the signal generator 2 and the switch 10. Thus the output terminal of the comparator 9 is connected to a control input of the signal generator 2 to turn it off so that now ringing signals can not be generated. The output terminal of the comparator 9 is also connected to the switch 10, so that at the same time, the logic one from the comparator 9 will cause the switch 10 to switch to the low reference voltage REFL, which henceforth is compared to the voltage in the summation node 4 by the comparator 9.

If then the potential in the summation node 4 is still above the low reference voltage REFL, an off-hook condition is decided to exist.

However, if the potential in the summation node 4 rapidly falls below the low reference voltage REFL, what indicates that a considerable current I1 is drawn from the node 4 and thus the voltage UL is considerable, the output signal of the comparator 9 will again be a logic zero. This logic zero causes the signal generator 2 to again start providing the low voltage signal of the same frequency and the same shape as the ringing signal. That logic zero also causes the switch 10 to again apply the high reference voltage REFH to the comparator 9 to be compared thereby.

In providing the potential of the node 4 to the input of the comparator 9, the potential can suitably be low-pass filtered by a filter circuit, not shown, for removing undesired AC-components.

Figure 5:
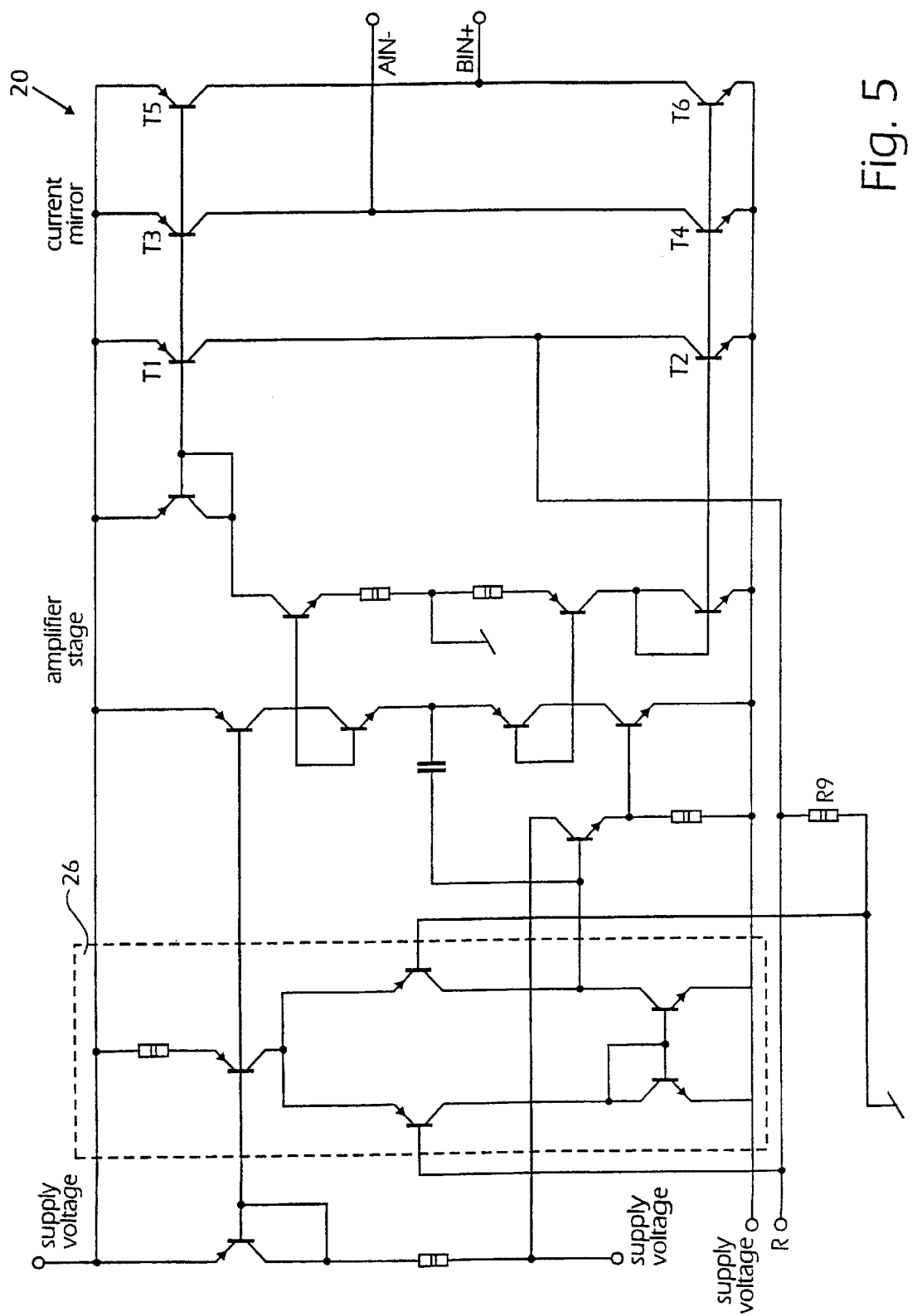
FIG. 5 is circuit diagram of current mirroring device used in the apparatuses of FIGS. 1–4.

A simplified circuit diagram of the mirror device 20 is shown in FIG. 5. The line from the resistor RDC is connected to the input R of the circuit, where thus the current IR is entering. This input terminal is connected to the positive input terminal of a differential amplifier 26, the positive input terminal of which is connected to ground. The input terminal R is for stationary conditions at virtual ground and then no current will flow through the resistor R9. The current IR flows to the interconnection point of two transistors T1, T2 of opposite types, one PNP- and one NPN-transistor, connected in series so that their collectors are joined at the interconnection point. The transistors T1, T2 have their bases connected to the bases of similar transistors T3, T4 and T5, T6 connected in the same way in two parallel current mirroring circuits. All PNP-transistors T1, T3, T5 have thus their bases connected to each other and the same is true for all NPN-transistors T2, T4, T6. From the interconnection points in those parallel mirroring circuits the currents AIN− and BIN+ are drawn from (or actually delivered to) the output terminals of the mirror device 20. The transistor bases are also connected to an intermediate amplifier stage that controls the potential at the input terminal R to be at ground potential.

Figure 2:
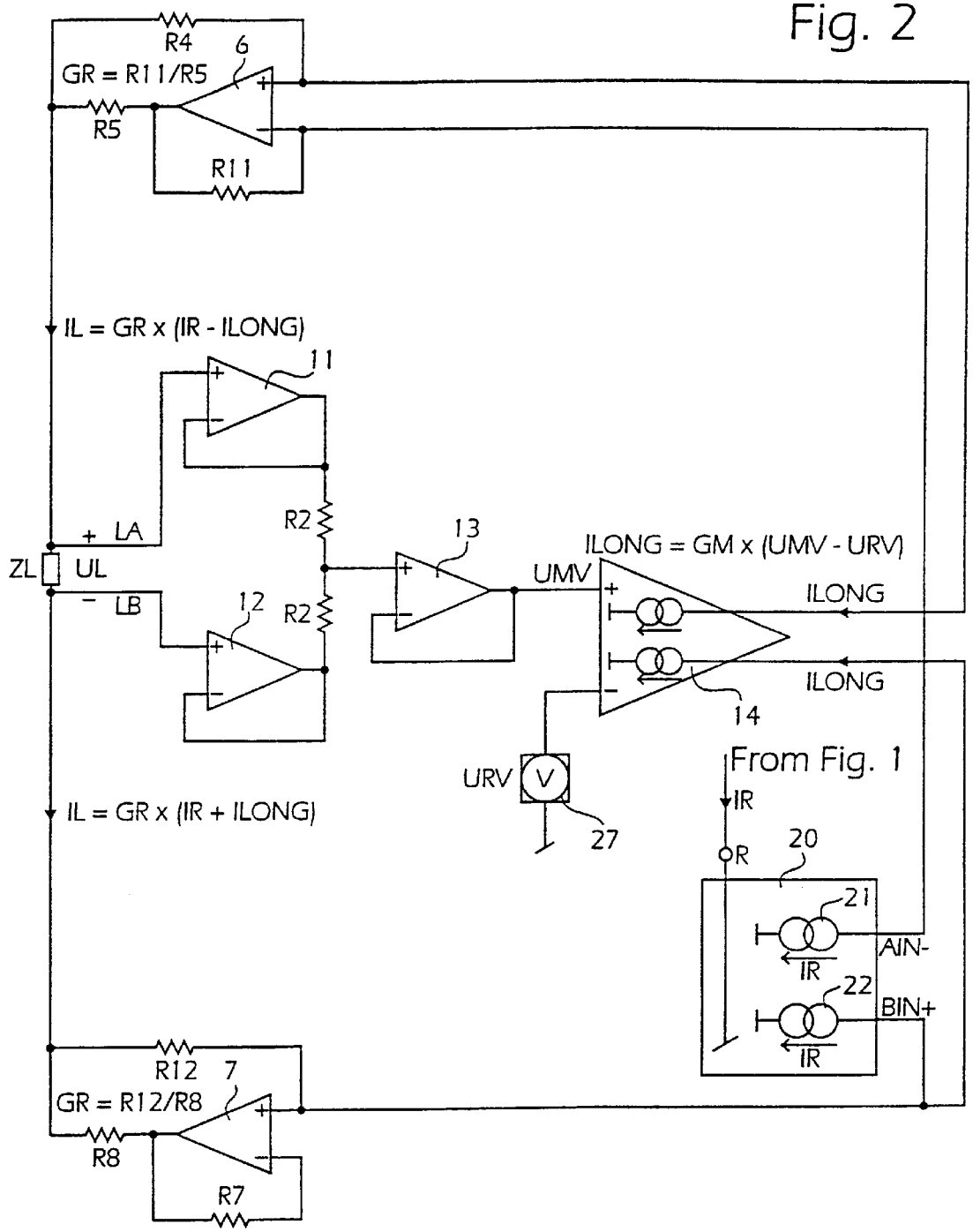
FIG. 2 is a circuit diagram of an apparatus for providing balanced ringing.

FIG. 2 shows a circuit diagram of the components needed for providing the subscriber line with the appropriate DC-currents for producing a balanced ringing between the A- and B-wires LA and LB, the subscriber's station being represented by the impedance ZL as above. The voltage across the subscriber impedance ZL is UL. The diagram of FIG. 2 is to used together with that of FIG. 1 where the components needed for generating the ringing signal are depicted. In FIG. 2 the mirror device 20 and the output, current amplifying circuits comprising the amplifiers 6, 7 are the same components which are shown in FIG. 1.

The A- and B-wire voltages are picked up or buffered by means of buffer amplifiers 11 and 12, respectively, and the output terminals of these amplifiers are interconnected by two equal resistors R2 connected in series. In the interconnection point between the resistors R2, an instantaneous potential UMV is then obtained which is the average value of the A- and B-wire voltages. This instantaneous potential UMV is buffered by a buffer amplifier 13 and supplied to a first input terminal of a transconductance amplifier 14. A DC reference voltage value URV from a voltage source 27 is supplied to a second input terminal of the transconductance amplifier 14 to be compared to the instantaneous voltage value UMV in order to obtain a difference value (UMV−URV). That difference value is amplified by the amplifier 14 with a conductance factor gm to produce a current intensity of gm×(UMV−URV), and it is by the transconductance amplifier 14 drawn as equal currents ILONG from its two output terminals which, as schematically illustrated, are connected to the positive input terminals of the operational amplifiers 6 and 7, see also FIG. 1, to be added there, with suitable arithmetical signs to the ringing signal current IR, respectively, the added signals being amplified by the factor GR by the operation amplifier circuits. Hereby, the current GR×(IR−ILONG) is supplied to the A-wire and the current GR×(IR+ILONG) is drawn from the B-wire. These currents must be equal in a stationary state, i.e. ILONG must vanish, and they are controlled by the feedback loop described until it is achieved and then the voltage difference UMV−URV will also be equal to zero.

Figure 3:
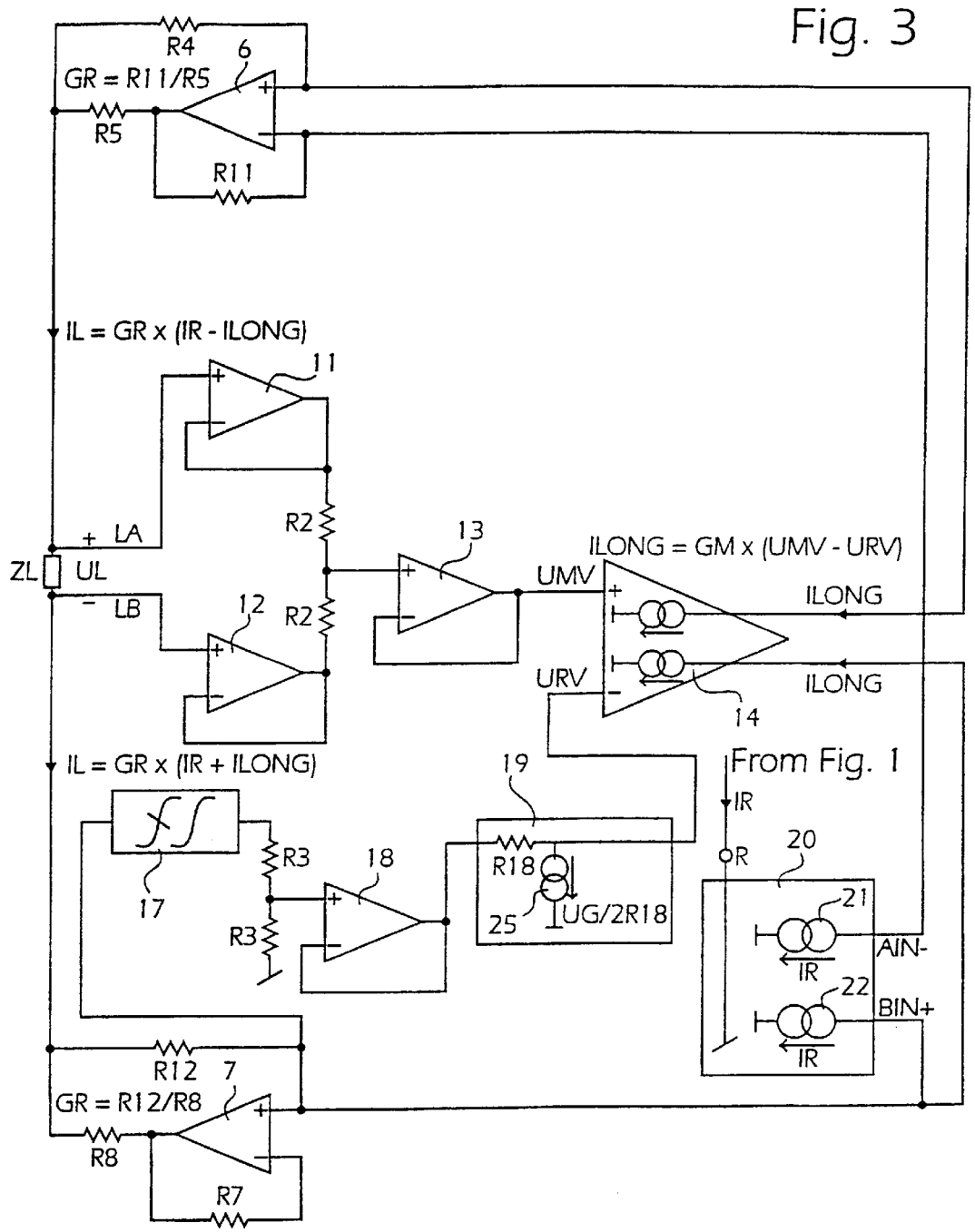
FIG. 3 is a circuit diagram of an apparatus for providing unbalanced ringing.

FIG. 3 shows a circuit diagram similar to that of FIG. 2 but for providing unbalanced ringing between the A- and B-wires LA and LB to a subscriber's station represented by the impedance ZL. Since the elements of the embodiment in FIG. 3 are identical to the elements of the embodiment on FIG. 2 except what concerns the elements for generating the reference voltage value URV, identical elements in FIGS. 2 and 3 will not be described in detail.

In the embodiment of FIG. 3, the reference voltage value URV is generated by having a low pass filter 17 connected to the B-wire LB in order to filter the B-wire voltage essentially to find its DC-component, a possible ringing signal then being removed from the B-wire voltage. The low pass filtered voltage is divided by two by means of two resistors R3 of equal resistances which are connected in series between the output terminal of the filter 17 and ground. The interconnection point between the resistors R3 which then has a potential equal to half the DC-potential of the B-wire, is connected to the input terminal of a buffer amplifier 18, and the output terminal of the buffer amplifier 18 is connected to the input terminal of a voltage subtraction circuit 19. The voltage subtraction circuit 19 is adapted to subtract a predetermined, constant voltage UG/2 from the voltage on the output terminal of the buffer amplifier 18 to obtain the reference voltage value URV which is supplied to the other input terminal of the transconductance amplifier 14. The voltage UG/2 subtracted by the voltage subtracting circuit 19 corresponds to the desired voltage of the A-wire. Thus, it is set to a suitable DC level to provide for example a DC-level a little below ground potential on the A-wire. The A-wire will then have the constant potential of −UG, this value being a small negative voltage of the order of magnitude of e.g. −2 volts.

The voltage subtraction circuit 19 can comprise a resistor R10 producing a current therethrough, from which a current having the value UG/(2·R10) is subtracted by connecting a constant current source 25 producing this current intensity.

Figure 4:
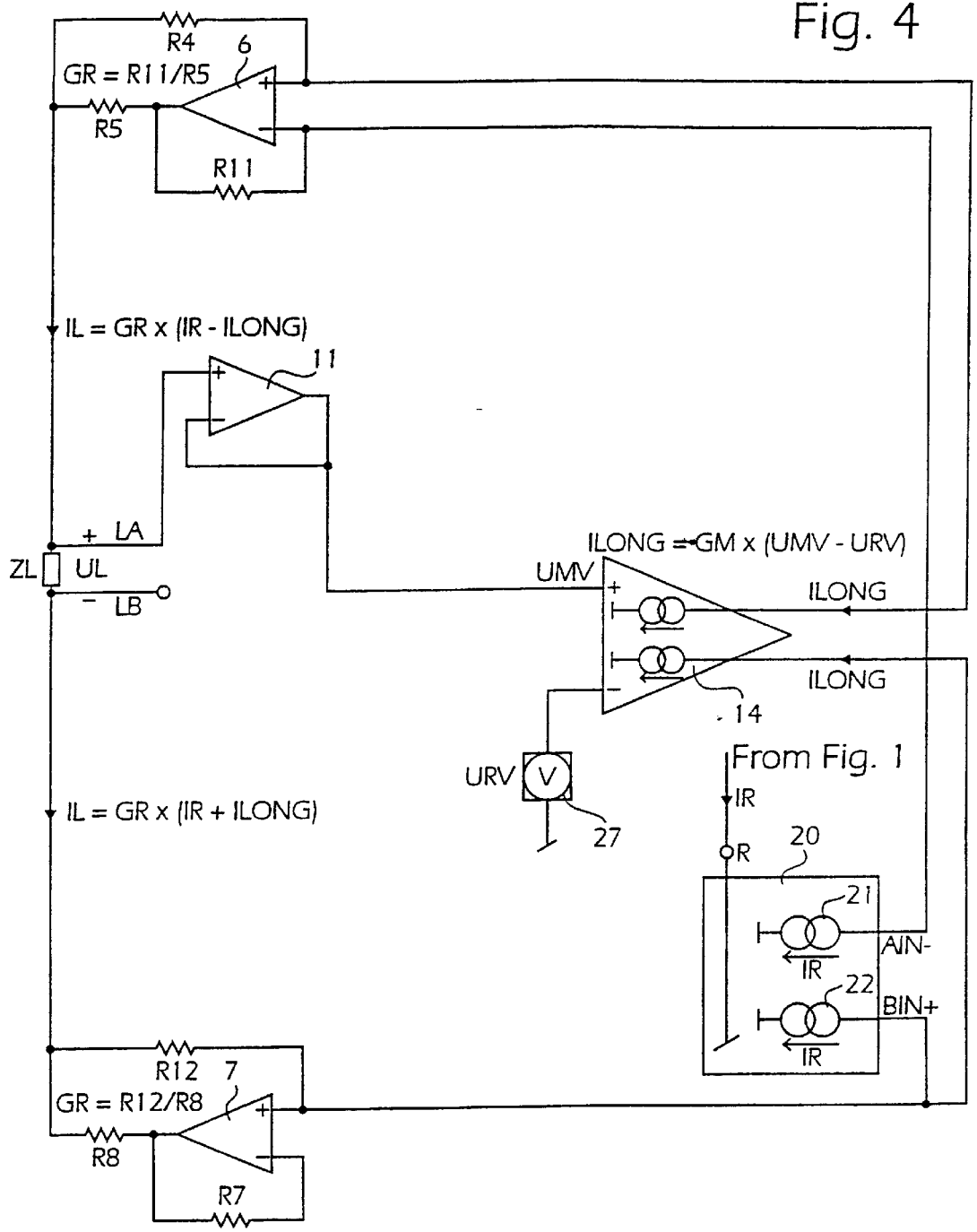
FIG. 4 is a circuit diagram of an alternative apparatus for providing unbalanced ringing.

In accordance with a second embodiment of the apparatus for unbalanced ringing between the A- and B-wires, see FIG. 4, the voltage of the A-wire is sensed by the amplifier 11 to obtain an instantaneous value. The amplifier 11 is directly connected to an input terminal of the transconductance amplifier 14, which has its other input connected to receive a predetermined, constant reference voltage URV as in the circuit of FIG. 2. In the amplifier 14 the instantaneous value is thus compared to the DC- voltage value to obtain a difference value and the currents supplied to the A- and B-wires are in same way has been described above controlled until said difference value is zero.

What is claimed is:

1. A method for generating a ringing signal of a predetermined frequency and shape on a telephone line to a subscriber's station between A- and B-wires of the line, comprising the steps of;

converting a voltage between the A- and B-wires into a first current, generating a first voltage having a frequency substantially equal to that of and a shape substantially the same as that of the ringing signal to be generated, converting the first voltage into a second current, subtracting the first current from the second current to obtain a third current, converting the third current into a second voltage, converting the second voltage into a fourth current, and amplifying the fourth current, and supplying the amplified fourth current to the A-wire while drawing the amplified fourth current from the B-wire.

2. A method according to claim 1, further comprising the steps of:

generating a constant fifth current, and adding the fifth current to the result of subtracting the first current from the second current to modify the third current, so that the currents supplied and drawn from the A- and B-wires respectively will produce a corresponding difference in DC-level between the wires.

3. A method according to claim 2, further comprising the steps of:

setting a reference voltage to a first value, comparing the second voltage to the reference voltage, interrupting, in the case where the second voltage exceeds the reference voltage, which indicates that the subscriber's station has answered, the generation of the first voltage thus also interrupting the generation of the ringing signal.

4. A method according to claim 3, further comprising the steps of:

lowering, after the interrupting step, the value of the reference voltage to a second value, comparing the second voltage again to the reference voltage, resuming, in the case where the second voltage now is lower than the reference voltage, the generation of the first voltage, and also increasing the reference voltage to the first higher value, after which the steps of claim 2 are repeated.

5. A method according to claim 1, further comprising, for balanced ringing between the A- and B-wires, sensing an instantaneous value being the average of the A- and B-wire voltages, comparing the instantaneous value with a reference value to obtain a difference value, and controlling the currents supplied to the A- and B-wires until the difference value is zero, characterized in that the reference value is a predetermined DC-voltage.

6. A method according to claim 1, further comprising unbalanced ringing between the A- and B-wires, sensing an instantaneous value being the average of the A- and B-wire voltages, comparing the instantaneous value with a reference value to obtain a difference value, and controlling the currents supplied to the A- and B-wires until the difference value is zero, wherein the reference value is generated by sensing the B-wire voltage, low pass filtering the sensed B-wire voltage, dividing the low pass filtered voltage by a predetermined amount to produce a predetermined fraction of the low pass filtered voltage and subtracting a predetermined constant voltage from the divided voltage to obtain the reference value.

7. A method according to claim 1, further comprising for unbalanced ringing between the A- and B-wires, sensing the A-wire voltage to obtain an instantaneous value, comparing the instantaneous value with a DC voltage value to obtain a difference value, and controlling the currents supplied to the A- and B-wires until the difference value is zero.

8. An apparatus for generating a ringing signal of a predetermined frequency and shape on a telephone line to a subscriber's station between A- and B-wires, comprising voltage converting means (1) for converting a voltage between the A- and B-wires into a first current, signal generating means for generating a first voltage of substantially the same frequency of the ringing signal to be generated and of substantially the same basic shape, signal converting means for converting the first voltage into a second current;

a summation node connected to the voltage converting means and to the signal converting means for subtracting the first current from the second current to obtain a third current, current-voltage converting means connected to the summation node for converting the third current into a second voltage, voltage-current converting means also connected to summation node for converting the second voltage into a fourth current, current amplifier means connected to the voltage-current converting means for amplifying the fourth current, and supplying the amplified fourth current to the A-wire while drawing the amplified fourth current from the B-wire.

9. An apparatus according to claim 8, further comprising constant current generation means connected to the summation node for generating a constant fifth current to be summed in the node; so that the currents supplied and drawn from the A- and B-wires respectively will produce a difference in DC-level between the wires which corresponds to the magnitude of the fifth current.

10. An apparatus according to claim 8, further comprising a comparator connected to the summation node for comparing the second voltage to a reference voltage, the comparator being connected to the signal generating means to control it for interrupting, in the case where the result of the comparison is that the second voltage is larger than the reference voltage, which indicates that the subscriber's station has answered, the generation of the first voltage, whereby the ringing signal is interrupted.

11. An apparatus according to claim 10, further comprising a switch arranged to connect a first reference voltage source or a second reference voltage source to the comparator to provide the reference voltage thereto, the first reference voltage source providing a higher voltage than that provided by the second voltage source, the comparator being also connected to the switch to control it to connect, also in the case where the result of the comparison made by the comparator is that the second voltage is larger than the reference voltage, the second reference voltage source to the comparator so that the second voltage henceforth is compared to the voltage provided by the second reference voltage, and otherwise, in the case where the result of the comparison made by the comparator is that the second voltage is smaller than the reference voltage, the comparator being arranged to control the signal generator means to start generating the first voltage and to control the switch to connect the first reference voltage source to the comparator so that the second voltage henceforth is compared to the voltage provided by the first reference voltage.

12. An apparatus according to claim 8, further comprising balanced ringing between the A- and B-wires, sensing means for sensing the average value of the A- and B-wire voltages to obtain an instantaneous value, comparing means connected to the sensing means for comparing the instantaneous value to a reference value to obtain a difference value, and control means connected to the comparing means for controlling the currents supplied to the A- and B-wires until the difference value is zero, and a DC voltage source connected to the comparing means for providing the reference value.

13. An apparatus according to claim 8, further comprising unbalanced ringing between the A- and B-wires, sensing means for sensing the average value of the A- and B-wire voltages to obtain an instantaneous value, comparing means connected to the sensing means for comparing the instantaneous value to a reference value to obtain a difference value, control means connected to the comparing means for controlling the currents supplied to the A- and B-wires until the difference value is zero, and reference value means connected to the comparing means for generating the reference value and comprising filter means for low pass filtering the B-wire voltage, dividing means connected to the filter means for producing a fraction voltage being a predetermined fraction of the low-pass filtered B-wire voltage, means for subtracting a predetermined constant voltage from the fraction voltage to obtain the reference value provided to the comparing means.

14. An apparatus according to claim 8, further comprising unbalanced ringing between the A- and B-wires, sensing means for sensing the A-wire voltage to obtain an instantaneous value, comparing means connected to the sensing means for comparing the instantaneous value to a DC voltage value to obtain a difference value, and control means connected to the comparing means for controlling the currents supplied to the A- and B-wires until the difference value is equal to zero.

* * * * *